United States Patent Office 3,053,678
Patented Sept. 11, 1962

3,053,678
SPUNDYED REGENERATED CELLULOSE PRODUCTS
Konrad Mix, Frankfurt am Main, Fechenheim, Germany, assignor to Cassella Farbwerke Mainkur Aktiengesellschaft, Frankfurt am Main, Fechenheim, Germany, a company of Germany
No Drawing. Filed Mar. 17, 1961, Ser. No. 96,381
Claims priority, application Germany Mar. 23, 1960
4 Claims. (Cl. 106—165)

This invention relates to the manufacture of regenerated cellulose products spundyed with nitroaryl-hydrazone pigments.

Among the current methods for the dyeing of regenerated cellulose there is the spin dyeing with finely dispersed pigment dyes which is of utmost importance.

In producing spundyed regenerated cellulose products, such as viscose rayon, fibers and films, the coloring matter, such as pigment material, is dispersed in the spinning solution which solution is then extruded through suitable spinnerets or other shape forming devices into coagulating and subsequent processing baths before the spun or extruded products are finally dried. A colored product is thus produced.

Such a process is frequently preferred to that process wherein the products are dyed after the extrusion, coagulation and other processing steps. With spindyeing, colored or dyed products are initially provided which may be further treated without the necessity of any subsequent dyeing.

In the spin dyeing processes hitherto known there have been used as pigment dyes chiefly water-insoluble azo dyes, such as β-hydroxy-naphthoic-acid-arylides or high-quality vat dyes.

Now, I have found that most satisfactory spundyed products of regenerated cellulose may be easily obtained from the well-known viscose spinning solutions by incorporating into the viscose spinning solutions mono- or di-nitroaryl-hydrazones in a finely dispersed form which contain in the molecule at least 3 phenyl nuclei. The phenyl nuclei may be combined with each other in any way, viz. they may be condensed or directly or indirectly linked with each other.

The nitroaryl-hydrazones used according to my invention may bear additional substituents of the group consisting of alkyl, cycloalkyl, oxyalkyl, aryl, aralkyl, carbonyl, alkoxy, aryloxy, acyl, nitro, halogeno, sulfonyl, amino and azo radicals.

Thus, products are obtained which, depending on the constitution of the employed nitroaryl-hydrazone, are dyed in clear yellow, orange, red to brown shades, the dyeings of which distinguish themselves by excellent fastness properties to light, ironing, washing, boiling, weather etc.

This result was surprising. In particular, it could not be foreseen that the nitroaryl-hydrazones used according to my invention would be stable in the strongly alkaline viscose solution or remain unchanged in their color shade, particularly since it is known that one characteristic feature of the simple nitrophenyl-hydrazones, which is decisive for their analytical determination is that considerable alteration of shade occurs in the presence of alkali active agents.

The nitroaryl-hydrazones which are suitable for the process of the present invention may be prepared in the known methods, such as being described in Houben-Weyl "Methoden der organischen Chemie," Fourth edition, volume VII/1, page 465, by reacting nitroaryl-hydrazines with appropriate carbonyl compounds, preferably in an acid pH-range.

Especially suited are the hydrazones of the following nitroaryl-hydrazines:

2,4-dinitro-phenyl-hydrazine
2,4-dinitrophenylene-1,5-dihydrazine
2-nitro-4(N)-methylsulfamido-phenylhydrazine
2-nitro-4(N)-dimethylsulfamido-phenylhydrazine
2,4-dinitro-5-chloro-phenylhydrazine.

The following tables enumerate a series of such hydrazones together with the color shades obtained thereby in the spin dyeing of viscose.

TABLE I

| Mono-2,4-dinitrophenylhydrazones of the following carbonyl compounds | Formulae 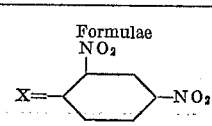 | Color |
|---|---|---|
| 1. Benzophenone | 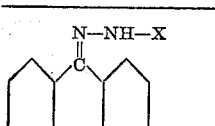 | Yellow. |
| 2. 4,4'-dibromobenzophenone | 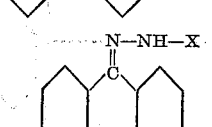 | Do. |
| 3. 4-methoxy-benzophenone | 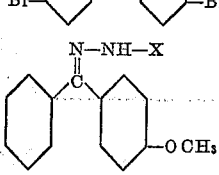 | Golden yellow. |

TABLE I—Continued

| Mono-2,4-dinitrophenylhydrazones of the following carbonyl compounds | Formulae $X=\underset{NO_2}{\overset{NO_2}{\bigcirc}}-NO_2$ | Color |
|---|---|---|
| 4. 2,4-dimethoxy-benzophenone | 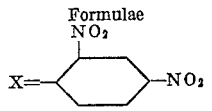 | Orange. |
| 5. Trichloro-benzophenone | 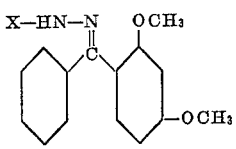 | Yellow. |
| 6. 4-nitro-benzophenone | 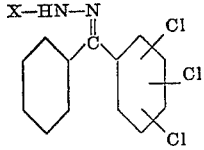 | Do. |
| 7. Fluorenone | 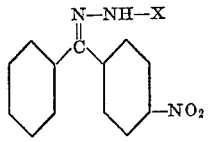 | Do. |
| 8. Benzalacetophenone | 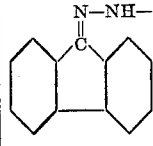 | Orange. |
| 9. Dibenzalacetone | 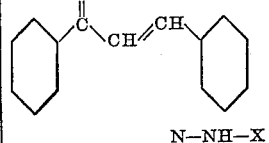 | Do. |
| 10. 4-phenyl-acetophenone | 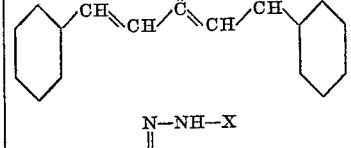 | Do. |
| 11. 4-(4'-nitrophenyl)-acetophenone | 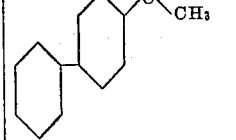 | Golden yellow. |
| 12. 4-phenyl-benzophenone | 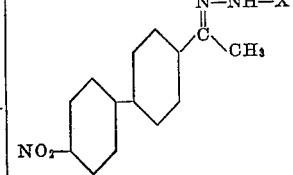 | Do. |
| 13. 4-(2'-nitro-phenyl)-benzophenone | 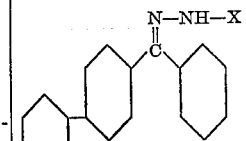 | Yellow. |

TABLE I—Continued

| Mono-2,4-dinitrophenylhydrazones of the following carbonyl compounds | Formulae $X = \underset{NO_2}{\underset{|}{\bigcirc}} - NO_2$ | Color |
|---|---|---|
| 14. 2-acetyl-dibenzofuran | 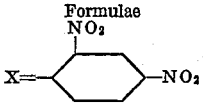 | Golden yellow. |
| 15. 1-naphthyl-methylketone | 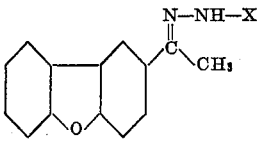 | Do. |
| 16. 2-naphthyl-methylketone | 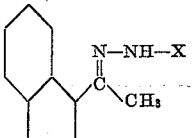 | Do. |
| 17. 1-naphthyl-phenylketone | 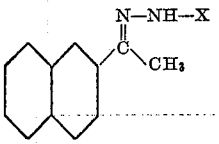 | Do. |
| 18. 2-naphthyl-phenylketone | 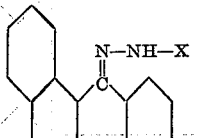 | Do. |
| 19. 4-acetamino-benzophenone | 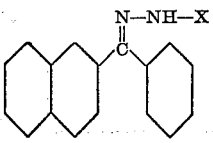 | Orange. |
| 20. 4-(4'-acetaminophenyl)-acetophenone | 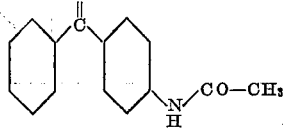 | Red. |
| 21. 4-(β-chloropropionylamino)-benzophenone | 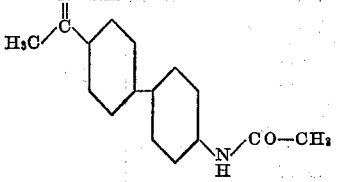 | Orange. |
| 22. 4-[4'-(β-chloropropionylamino)-phenyl]-acetophenone | 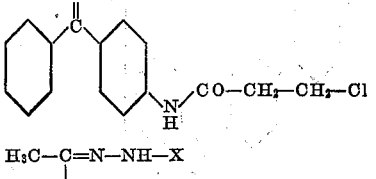 | Red. |

TABLE I—Continued

| Mono-2,4-dinitrophenylhydrazones of the following carbonyl compounds | Formulae $X=\underset{NO_2}{\underset{|}{\bigcirc}}-NO_2$ | Color |
|---|---|---|
| 23. Coupling product of diazotized 4-aminobenzophenone with acetoacetanilide. | 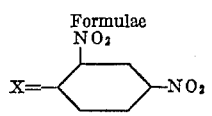 | Yellowish brown. |
| 24. 4-(4'-dimethylaminophenylazo)-benzophenone | 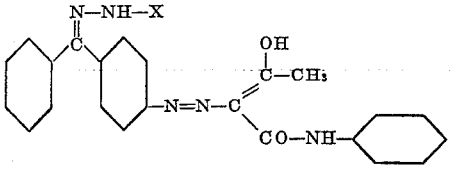 | Orange. |
| 25. 1,4-dibenzoylnaphthaline | 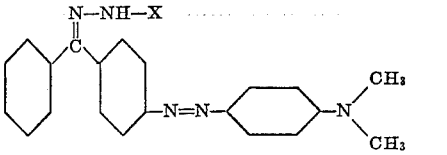 | Yellow. |
| 26. Anthraquinone-2-aldehyde | 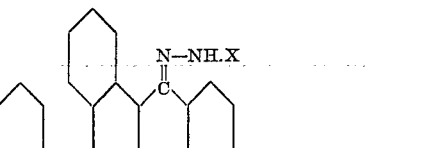 | Do. |
| 27. 1-amino-anthraquinone-2-aldehyde | 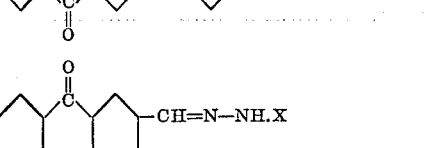 | Red. |

TABLE II

| Bis-2,4-dinitrophenylhydrazones of the following carbonyl compounds | Formulae $X=\underset{NO_2}{\underset{|}{\bigcirc}}-NO_2$ | color |
|---|---|---|
| 28. 4,4'-dibenzoyl-diphenyl. | 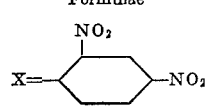 | Yellow. |
| 29. 1,5-dibenzoyl-naphthalene. | 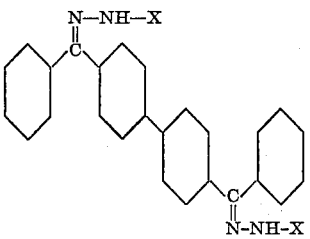 | Do. |
| 30. 1,4-dibenzoyl-naphthalene. | 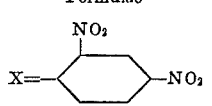 | Do. |

TABLE III

| Further nitro-phenylhydrazones | Formulae | Color |
|---|---|---|
| 31. Benzophenone-(2-nitro-4-N-methylsulfamido-phenylhydrazone). | H₃C.NH.O₂S—[ring]—NH—N=C(phenyl)₂, with —NO₂ | Golden yellow. |
| 32. Benzophenone-(2-nitro-4-N,N-dimethylsulfamido-phenylhydrazone). | (CH₃)₂.N.O₂S—[ring]—NH—N=C(phenyl)₂, with —NO₂ | Do. |
| 33. Benzophenone-(2,4-dinitro-5-chlorophenylhydrazone). | Cl, O₂N substituted ring—NH—N=C(phenyl)₂, with —NO₂ | Yellow. |
| 34. Condensation product of 1 mol 4,6-dinitrophenylene-1,3-dihydrazine with 2 mols of benzophenone. | (C₆H₅)₂C=N—NH—[ring(O₂N, NO₂)]—N(H)—N=C(C₆H₅)₂ | Greenish yellow. |
| 35. Condensation product of 1 mol 4,6-dinitro-phenylene-1,3-dihydrazine with 2 mols of benzaldehyde. | C₆H₅—CH=N—NH—[ring(O₂N, NO₂)]—NH—N=CH—C₆H₅ | Golden yellow. |
| 36. Condensation product of 1 mol 4,6-dinitro-phenylene-1,3-dihydrazine with 2 mols of anisaldehyde. | H₃CO—C₆H₄—CH=N—NH—[ring(O₂N, NO₂)]—NH—N=CH—C₆H₄—OCH₃ | Red. |
| 37. Condensation product of 1 mol 4,6-dinitro-phenylene-1,3-dihydrazine with 1 mol benzophenone and 1 mol acetone. | (H₃C)₂C=N—HN—[ring(O₂N, NO₂)]—NH—N=C(C₆H₅)₂ | Yellow. |
| 38. Condensation product of 1 mol 4,6-dinitro-phenylene-1,3-dihydrazine with 1 mol benzophenone and 1 mol 4-methyl-4-hydroxypentanone-(2). | CH₃—C(=N—HN—[ring(O₂N, NO₂)]—NH—N=C(C₆H₅)₂)—CH₂—C(CH₃)₂—OH | Golden yellow. |
| 39. Condensation product of 1 mol 4,6-dinitro-phenylene-1,3-dihydrazine with 1 mol benzophenone and 1 mol acetophenone. | (C₆H₅)(CH₃)C=N—NH—[ring(O₂N, NO₂)]—NH—N=C(C₆H₅)₂ | Do. |

TABLE III—Continued

| Further nitro-phenylhydrazones | Formulae | Color |
|---|---|---|
| 40. Condensation product of 1 mol 4,6-dinitro-phenylene-1,3-dihydrazine with 1 mol benzophenone and 1 mol propion-aldehyde. | (C$_6$H$_5$)$_2$C=N—NH—C$_6$H$_2$(NO$_2$)$_2$—NH—N=CH—CH$_2$—CH$_3$ | Do. |
| 41. Condensation product of 1 mol 4,6-dinitro-phenylene-1,3-dihydrazine with 1 mol benzophenone and 1 mol croton-aldehyde. | (C$_6$H$_5$)$_2$C=N—NH—C$_6$H$_2$(NO$_2$)$_2$—NH—N=CH—CH=CH—CH$_3$ | Do. |
| 42. Condensation product of 1 mol 4,6-dinitro-phenylene-1,3-dihydrazine with 1 mol benzophenone and 1 mol cyclo-hexanone. | (C$_6$H$_5$)$_2$C=N—NH—C$_6$H$_2$(NO$_2$)$_2$—NH—N=C(CH$_2$CH$_2$)$_2$CH$_2$ (cyclohexylidene) | Yellow. |
| 43. Condensation product of 1 mol 4,6-dinitro-phenylene-1,3-dihydrazine with 1 mol 4-phenylacetophenone and 1 mol acetone. | (CH$_3$)(C$_6$H$_4$-C$_6$H$_5$)C=N—NH—C$_6$H$_2$(NO$_2$)$_2$—NH—N=C(CH$_3$)$_2$ | Golden yellow. |
| 44. Condensation product of 2 mols benzophenone-(2,4-dinitro-5-chlorophenylhydrazone) with 1 mol 4,4'-diamino-diphenyl. | [(C$_6$H$_5$)$_2$C=N—NH—C$_6$H$_2$(NO$_2$)$_2$—NH—C$_6$H$_4$—]$_2$ | Brown. |
| 45. Condensation product of 2 mols 2,4-dinitro-5-(diphenylmethylene - hydrazino) - phenylhydrazine with 1 mol glyoxal. | [(C$_6$H$_5$)$_2$C=N—NH—C$_6$H$_2$(NO$_2$)$_2$—NH—N=CH—]$_2$ | Yellow. |
| 46. Condensation product of 2 mols 2,4-dinitro-5-(diphenyl - methylene - hydrazino) - phenylhydrazine with 1 mol diacetyl. | [(C$_6$H$_5$)$_2$C=N—NH—C$_6$H$_2$(NO$_2$)$_2$—NH—N=C(CH$_3$)—]$_2$ | Do. |

Nitroaryl-hydrazones for the spin dyeing of viscose are preferably prepared in form of an aqueous paste which is obtained by grinding finely the pigment up to a medium granular size of about 1μ in the presence of water. Common dispersing and grinding auxiliaries can be added to the aqueous dispersion.

The introduction of the dye paste into the viscose may be made at any stage of its preparation.

The following example will further illustrate how my invention may be carried out in practice, but the invention is not restricted to this example. The parts given are by weight and the percentages are percentage-by-weight.

*Example*

1000 parts viscose spinning solution prepared from shredded cellulose, sodium hydroxide, carbon disulfide and water, corresponding to 85 parts regenerated cellulose, are admixed at a temperature of 15–25° C. with 4.25 parts pigment dye paste which has been prepared according to the method described hereinafter, and the mixture is stirred for half an hour. The mass is then spun or extruded in the usual manner or a spinning machine. The coagulation of the viscose is effected in a sulfuric acid precipitation bath, then the material thus spun is aftertreated in the usual manner with water and solutions of diluted alkali, diluted acid and, if desired, with a solution of sodium hypochlorite.

To prepare the pigment dye paste 100 parts of one of the before-mentioned nitroaryl-hydrazones are ground together with 25 parts sodium dinaphthyl-methane-disulfonate and about 300 parts of water, until a particle size of about 1μ is obtained.

Then the dyestuff content is adjusted to a content of 20% of the total mixture by means of water.

What I claim is:

1. A process of manufacturing spundyed regenerated cellulose products from viscose spinning solutions comprising the steps of incorporating into the viscose spinning solution nitroaryl-hydrazones selected from the group consisting of mono- and dinitroaryl-hydrazones in a finely dispersed form, said hydrazones containing in the molecule at least 3 phenyl nuclei, and coagulating the resultant spinning solution in an acid bath.

2. A process of manufacturing spundyed regenerated cellulose products from viscose spinning solutions comprising the steps of incorporating into the viscose spinning solution nitroaryl-hydrazones selected from the group consisting of mono- and dinitroaryl-hydrazones in form of a finely dispersed dye paste, said hydrazones containing in the molecule at least 3 phenyl nuclei, and coagulating the resultant spinning solution in an acid bath.

3. A process of manufacturing spundyed regenerated cellulose products from viscose spinning solutions comprising the steps of incorporating into the viscose spinning solution nitroaryl-hydrazones selected from the group consisting of mono- and dinitroaryl-hydrazones in a finely dispersed form, said hydrazones containing in the molecule at least 3 phenyl nuclei and bearing at least one of the substituents of the group consisting of alkyl, cycloalkyl, oxyalkyl, aryl, aralkyl, carbonyl, alkoxy, aryloxy, acyl, nitro, halogeno, sulfonyl, amino and azo radicals, and coagulating the resultant spinning solution in an acid bath.

4. Spundyed regenerated cellulose products containing finely dispersed nitroaryl-hydrazones selected from the group consisting of mono- and dinitroaryl-hydrazones, said hydrazones containing in the molecules at least 3 phenyl nuclei.

References Cited in the file of this patent

UNITED STATES PATENTS

| | | |
|---|---|---|
| 2,911,314 | Armento et al. | Nov. 3, 1959 |
| 2,944,050 | Haubrick et al. | July 5, 1960 |
| 2,948,721 | Frey | Aug. 9, 1960 |

UNITED STATES PATENT OFFICE
CERTIFICATE OF CORRECTION

Patent No. 3,053,678                 September 11, 1962

Konrad Mix

It is hereby certified that error appears in the above numbered patent requiring correction and that the said Letters Patent should read as corrected below.

Column 10, under item 36, for the terminal carbon "C" on the right-hand nucleus read -- H --; column 12, item 43, the formula should appear as shown below instead of as in the patent:

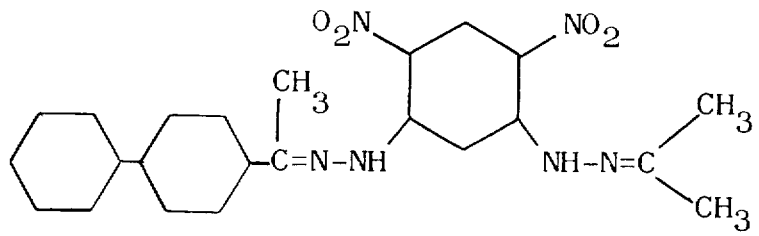

Signed and sealed this 12th day of March 1963.

(SEAL)
Attest:

ESTON G. JOHNSON                 DAVID L. LADD

Attesting Officer               Commissioner of Patents